(12) United States Patent
Bai et al.

(10) Patent No.: US 11,107,506 B2
(45) Date of Patent: Aug. 31, 2021

(54) METHOD AND SYSTEM FOR COMBINING AND EDITING UAV OPERATION DATA AND VIDEO DATA

(71) Applicant: SZ DJI TECHNOLOGY CO., LTD., Shenzhen (CN)

(72) Inventors: Gaoping Bai, Shenzhen (CN); Dajun Huo, Shenzhen (CN); Ruoying Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 51 days.

(21) Appl. No.: 16/242,629

(22) Filed: Jan. 8, 2019

(65) Prior Publication Data
US 2019/0164575 A1 May 30, 2019

Related U.S. Application Data

(63) Continuation of application No. PCT/CN2016/089340, filed on Jul. 8, 2016.

(51) Int. Cl.
| | | |
|---|---|---|
| *G11B 27/34* | (2006.01) | |
| *G11B 27/031* | (2006.01) | |
| *H04N 5/77* | (2006.01) | |
| *H04N 9/82* | (2006.01) | |
| *H04N 5/783* | (2006.01) | |
| *B64C 39/02* | (2006.01) | |

(Continued)

(52) U.S. Cl.
CPC ............ *G11B 27/34* (2013.01); *B64C 39/024* (2013.01); *B64D 47/08* (2013.01); *G11B 27/031* (2013.01);

(Continued)

(58) Field of Classification Search
CPC ........ G11B 27/031; G11B 27/34; H04N 5/77; H04N 5/772; H04N 5/783; H04N 9/8205;
(Continued)

(56) References Cited

U.S. PATENT DOCUMENTS

| | | | |
|---|---|---|---|
| 2007/0244608 A1* | 10/2007 | Rath ................... | G05D 1/0038 701/3 |
| 2010/0138446 A1* | 6/2010 | Canessa ................. | G06F 15/16 707/770 |

(Continued)

FOREIGN PATENT DOCUMENTS

| | | |
|---|---|---|
| CN | 103262169 A | 8/2013 |
| CN | 103795897 A | 5/2014 |

(Continued)

OTHER PUBLICATIONS

The World Intellectual Property Organization (WIPO) International Search Report and Written Opinion for PCT/CN2016/089340 dated Apr. 11, 2017, 7 pages.

*Primary Examiner* — Loi H Tran
(74) *Attorney, Agent, or Firm* — Anova Law Group, PLLC

(57) ABSTRACT

A system for combining data includes one or more processors that are, individually or collectively, configured to receive video data recorded by at least one sensor and operation data of a movable object that carries the at least one sensor, associate the operation data with the video data, and store the associated operation data and the video data in a video file. The operation data indicates one or more operation states of the movable object during a time period when the video data is recorded.

19 Claims, 7 Drawing Sheets

(51) Int. Cl.
*B64D 47/08* (2006.01)
*H04N 5/92* (2006.01)

(52) U.S. Cl.
CPC .............. *H04N 5/77* (2013.01); *H04N 5/772* (2013.01); *H04N 5/783* (2013.01); *H04N 5/9201* (2013.01); *H04N 5/9206* (2013.01); *H04N 9/8205* (2013.01); *H04N 9/8233* (2013.01); *B64C 2201/127* (2013.01); *B64C 2201/141* (2013.01)

(58) Field of Classification Search
CPC .. H04N 9/8233; H04N 5/9206; H04N 5/9201; B64D 47/08; B64C 2201/141; B64C 2201/127; B64C 39/024
USPC ........................................................ 386/227
See application file for complete search history.

(56) References Cited

U.S. PATENT DOCUMENTS

| | | | |
|---|---|---|---|
| 2013/0188923 A1* | 7/2013 | Hartley | H04N 21/47217 386/241 |
| 2015/0113013 A1* | 4/2015 | Rys | G06F 16/24 707/758 |
| 2015/0142211 A1* | 5/2015 | Shehata | H04W 4/42 701/2 |
| 2015/0289062 A1* | 10/2015 | Ungstrup | H04R 25/554 381/314 |
| 2016/0117931 A1* | 4/2016 | Chan | G08G 5/0069 701/120 |
| 2016/0373699 A1* | 12/2016 | Torres | H04N 5/23206 |
| 2017/0192418 A1* | 7/2017 | Bethke | G08G 5/0013 |
| 2017/0339213 A1* | 11/2017 | Dukatz | G06N 5/02 |
| 2018/0109767 A1* | 4/2018 | Li | H04N 5/33 |
| 2019/0011921 A1* | 1/2019 | Wang | B64C 39/024 |

FOREIGN PATENT DOCUMENTS

| | | |
|---|---|---|
| CN | 103942273 A | 7/2014 |
| CN | 104103300 A | 10/2014 |
| CN | 104766300 A | 7/2015 |
| CN | 105611277 A | 5/2016 |
| CN | 205263814 U | 5/2016 |
| CN | 105635616 A | 6/2016 |
| JP | 2004096617 A * | 3/2004 |
| WO | 2016025086 A1 | 2/2016 |
| WO | 2016174524 A2 | 11/2016 |

* cited by examiner

500

Receive a user input to search a video file obtained by a movable object, the video file comprising video data recorded by at least one sensor and operation data of the movable object that carries the at least one sensor, the operation data indicating one or more operation states of the movable object during a time period when the video data is recorded and being associated with the video data — 502

Identify, from the video file, operation data that corresponds to the user input — 504

Identify video data that corresponds to the identified operation data — 506

Fig. 6

METHOD AND SYSTEM FOR COMBINING AND EDITING UAV OPERATION DATA AND VIDEO DATA

CROSS-REFERENCE TO RELATED APPLICATION

This application is a continuation of International Application No. PCT/CN2016/089340, filed on Jul. 8, 2016, the entire contents of which are incorporated herein by reference.

TECHNICAL FIELD

The present disclosure relates generally to methods and systems for data combining and editing, and more particularly, to methods and systems for combining and editing Unmanned Aerial Vehicle (UAV) operation data and video data.

BACKGROUND

Since the increase in availability of video capturing devices, video editing tools have been in high demand for processing captured videos. Apart from regular video cameras, consumers are offered with a plethora of hand-held and aerial video devices such as camcorders, camera cellphones, and camera drones. Since such devices are also equipped with data storage and transfer functions, videos can be captured, stored, and transferred for playback or editing.

Video editing technologies, however, have not seen much change as that in the device realm. Currently, for various reasons, users still have to spend considerable time to edit videos before obtaining presentable clips. In one example, captured footages may contain unwanted scenes such as parts where the camera shakes too much or parts where an unexpected object blocks the view. In another example, a desirable video theme may be captured by more than one clip or at various time stamps in the same clip. In such situation, with existing technologies, users have to browse through the captured raw clips and manually select scenes to produce a final video. This editing process can become time-consuming and frustrating to most consumers.

SUMMARY

One aspect of the present disclosure is directed to a system for combining data. The system may comprise one or more processors, individually or collectively, configured to receive video data recorded by at least one sensor and operation data of a movable object that carries the at least one sensor, associate the operation data with the video data, and store the associated operation data and the video data in a video file. The operation data may indicate one or more operation states of the movable object during a time period when the video data is recorded.

Another aspect of the present disclosure is directed to a video editing device. The video editing device may comprise one or more processors configured to receive a user input to search a video file obtained by a movable object, the video file comprising video data recorded by at least one sensor and operation data of the movable object that carries the at least one sensor, and the operation data indicating one or more operation states of the movable object during a time period when the video data is recorded and being associated with the video data; identify, from the video file, operation data that corresponds to the user input; and identify video data that corresponds to the identified operation data.

Another aspect of the present disclosure is directed to a method for combining data. The method may comprise receiving video data recorded by at least one sensor and operation data of a movable object that carries the at least one sensor, the operation data indicating one or more operation states of the movable object during a time period when the video data is recorded; associating the operation data with the video data; and storing the associated operation data and the video data in a video file.

Another aspect of the present disclosure is directed to a video editing method. The method may comprise receiving a user input to search a video file obtained by a movable object, the video file comprising video data recorded by at least one sensor and operation data of the movable object that carries the at least one sensor, and the operation data indicating one or more operation states of the movable object during a time period when the video data is recorded and being associated with the video data; identify, from the video file, operation data that corresponds to the user input; and identifying video data that corresponds to the identified operation data.

Another aspect of the present disclosure is directed to a system for combining data. The system may comprise at least one sensor configured to record video data. The system may also comprise one or more processors, individually or collectively, configured to receive the video data and operation data of a movable object that carries the at least one sensor, the operation data indicating one or more operation states of the movable object during a time period when the video data is recorded; associate the operation data with the video data; and store the associated operation data and the video data in a video file.

Another aspect of the present disclosure is directed to one or more non-transitory computer-readable storage media having stored thereon executable instructions. The instruction, when executed by one or more processors of a system, may cause the system to receive video data recorded by at least one sensor and operation data of a movable object that carries the at least one sensor, the operation data indicating one or more operation states of the movable object during a time period when the video data is recorded, associate the operation data with the video data, and store the associated operation data and the video data in a video file.

Another aspect of the present disclosure is directed to one or more non-transitory computer-readable storage media having stored thereon executable instructions. The instructions, when executed by one or more processors of a system, may cause the system to receive a user input to search a video file obtained by a movable object, the video file comprising video data recorded by at least one sensor and operation data of the movable object that carries the at least one sensor, and the operation data indicating one or more operation states of the movable object during a time period when the video data is recorded and being associated with the video data; identify, from the video file, operation data that corresponds to the user input; and identify video data that corresponds to the identified operation data.

Another aspect of the present disclosure is directed to an Unmanned Aerial Vehicle (UAV). The UAV may comprise one or more processors, individually or collectively, configured to receive video data recorded by at least one sensor and operation data of a movable object that carries the at least one sensor, the operation data indicating one or more operation states of the movable object during a time period when the video data is recorded, associate the operation data with the video data, and store the associated operation data and the video data in a video file.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

FIG. 6 is a flowchart illustrating a method for editing UAV operation data and video data, consistent with exemplary embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. For brevity, the descriptions of components in one embodiment may be applicable to the same or similar components in a different embodiment, although different reference numbers may be used to refer the components in the different embodiment. The implementations set forth in the following description of exemplary embodiments consistent with the present disclosure do not represent all implementations consistent with the disclosure. Instead, they are merely examples of systems and methods consistent with aspects related to the disclosure.

Current video editing technologies are inconvenient to users for producing desirable video clips from raw footages. The disclosed systems and methods may mitigate or overcome one or more of the problems set forth above and/or other problems in the prior art.

Figure 1:
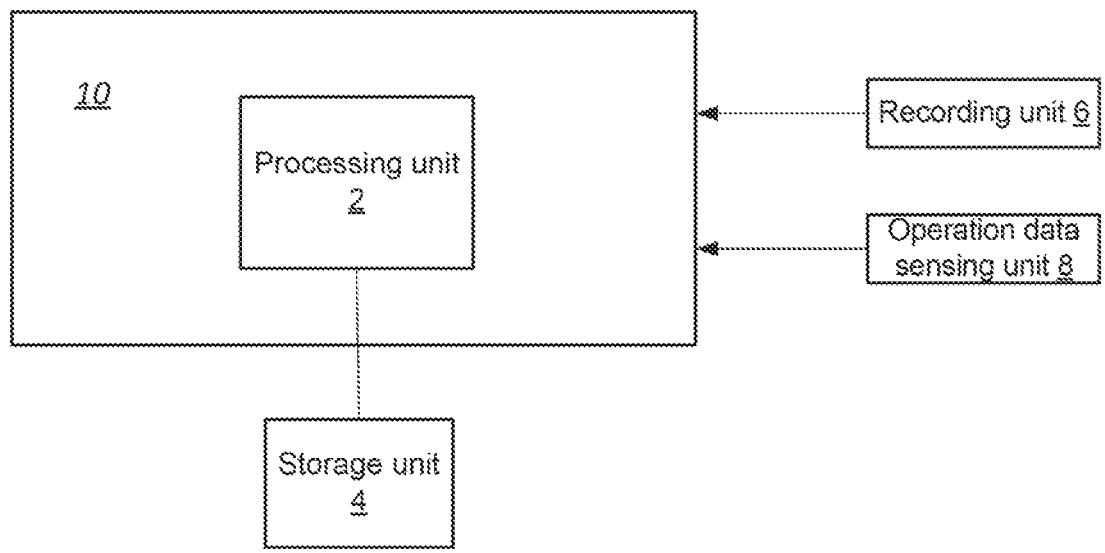
FIG. 1 is a block diagram illustrating a system for combining and/or editing operation data and video data, consistent with exemplary embodiments of the present disclosure.

FIG. 1 is a block diagram illustrating a system 10 for combining and/or editing operation data and video data, consistent with exemplary embodiments of the present disclosure. In some embodiments, the system 10 may include many more components than those shown in FIG. 1. However, it is not necessary that all of these components be shown in order to disclose an illustrative embodiment. The system 10 may include a processing unit 2, which may include one or more processors. In operation, the system 10 may be coupled to a storage unit 4, which may include computer memory that stores data. The system 10 may receive video data from outside sources, for example, a recording unit 6 (e.g., a sensor on a movable object). The system may also receive operation data from an operation data sensing unit 8. The operation data may be related to the video data. For example, in an exemplary embodiment, in which the recording unit 6 is a camera on a movable object, the operation data of the movable object indicates one or more operation states of the movable object during a time period when the video data is recorded. The one or more processors of the processing unit 2, may, individually or collectively, operate to associate the operation data with the video data. The processing unit 2 may also store the associated operation data and the video data in a video file in the storage unit 4.

The system 10 may be implemented as an independent device or an application on a computer or smart device (e.g., smart phone or tablet). In some embodiments, the system 10 may include the storage unit 4, the recording unit 6 (e.g., camera or microphone), and/or the operation data sensing unit 8 (e.g., inertial measurement unit or GPS) as described above. In some embodiments as described below, the system 10 may be implemented on the movable object and/or a controller of the movable object.

Figure 2:
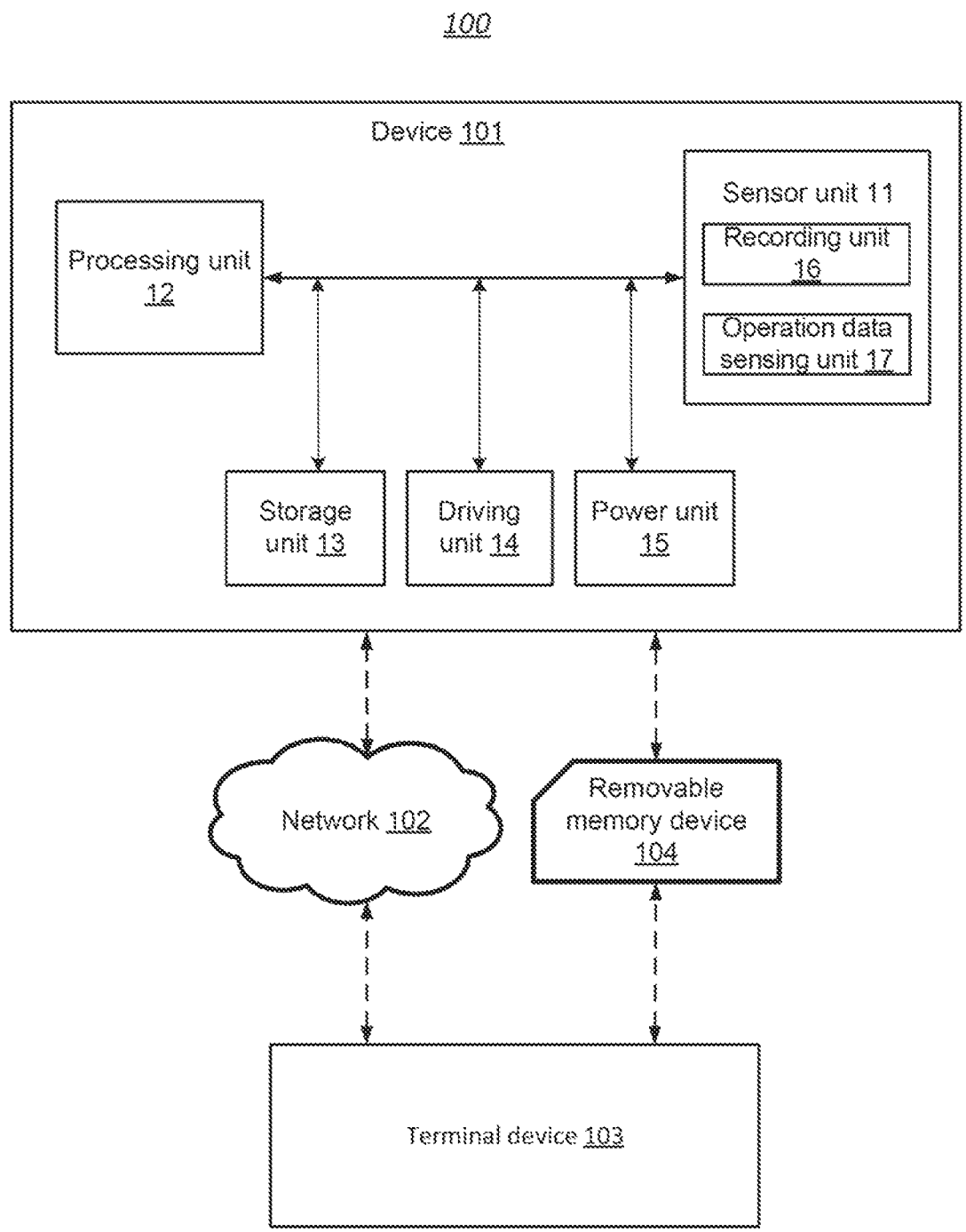
FIG. 2 is a block diagram illustrating a system for combining and/or editing UAV operation data and video data, consistent with exemplary embodiments of the present disclosure.

FIG. 2 is a block diagram illustrating a system 100 for combining and/or editing UAV operation data and video data, consistent with exemplary embodiments of the present disclosure. In some embodiments, the system 100 may include many more components than those shown in FIG. 2. However, it is not necessary that all of these components be shown in order to disclose an illustrative embodiment. The system 100 may include a device 101 and a terminal device 103 connected through a network 102. Although FIG. 2 illustrates several exemplary components of system 100, it is not necessary to require all of these components in order to combine and/or edit operation data and video data. It is neither necessary to require all of these components to perform other steps and methods described in this disclosure. For example, the device 101 or processing unit 12 itself can combine operation data and video data. The terminal device 103 itself can edit operation data and video data. That is, the device 101 and the terminal device 103 can work independently to perform one or more methods described in this disclosure. Further, the video data and/or the operation data may be captured by the device 101 as described below, by another module or device outside the device 101, or by a combination of both the device 101 and the outside module or device. Data captured by the outside module or device may be transmitted to the device 101 and/or the terminal device 103 through networks, cloud connection, or removable memories for data combining or editing. The network 102 may be a wire/cable-based or wireless connection, e.g., radio, Bluetooth, cloud connection, or WiFi, which allows data transmission and control between the device 101 and the terminal device 103. Alternative to the network 102, data, files, and/or instruction can be transferred or exchanged between device 101 and terminal device 103 through a removable memory device 104, such as a secure digital (SD) card or a thumb drive. The dash lines connected to the removable memory device 104 in FIG. 2 may indicate connections that rely on an removable storage device to transfer data among one device to another by plugging into these devices. For example, after capturing video data, the device 101 may store captured video data in the device 101 and/or transmit the captured video data to store in the terminal device 103 through a cloud network or through a removable memory card. For another example, the terminal device 103 may control the device 101 to move according to a predetermined mode (e.g., device 101 is a UAV being controlled to fly according to a predetermined flight pattern). The device 101 may connect to one or more other devices, such as computers, laptops, pads, cellphones, and servers, through the network 102.

In some embodiments, the device 101 may be a movable object, e.g., a UAV. An exemplary UAV is described below with reference to FIG. 3. The device 101 may be configured to combine UAV operation data and video data, e.g., perform method 400 described below with reference to FIG. 5. The terminal device 103 may be a controlling terminal or a monitoring terminal. The terminal device 103 may be a hand-held device, such as a mobile phone. The terminal device 103 may also be a special computer. An exemplary terminal device 103 is described below with reference to FIG. 4, embodied as system 300. The terminal device 103 may be configured to edit UAV operation data and video data, e.g., perform method 500 described below with reference to FIG. 6.

A movable object of the present disclosure may be a UAV and/or a hand-held device, such as a mobile phone, a handle, a gimbal, a gimbal platform, or a gimbal stabilizer. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. The movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons).

A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user. For example, the movable object may be controlled with the aid of a controlling terminal and/or monitoring terminal. The user may be remote from the movable object, or on or in the movable object while using the controlling terminal and/or monitoring terminal to control the movable object. The movable object can be an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human.

The device 101 may include a number of components and sub-components, some of which may be optional. The device 101 may include a sensor unit 11, a processing unit 12, a storage unit 13, a driving unit, and a power unit 15. The components of the device 101 may be operatively connected to each other via a bus or other types of communication channels. Some components of the device 101 may be integrated into one unit or one component. For example, the sensor unit 11 may be integrated with the processing unit 12.

The sensor unit 11 may include a recording unit 16 and an operation data sensing unit 17. The sensor unit 11 may comprise one or more sensors. The recording unit 16 and the operation data sensing unit 17 may be integrated as one sensor or operate as independent sensors. The sensor unit 11 can utilize different types of sensors that collect information relating to the surroundings of the device 101. Different types of sensors may detect and/or measure different types of signals.

In some embodiments, the recording unit 16 can include vision/image sensors to collect visual signals (e.g., video data) and/or microphones to collect sound. The recording unit 16 can include any device capable of recording and/or processing audio, video, still images, or other signals as analog or digital data. Examples of recording unit can include cameras (e.g., digital cameras), camcorders, video cameras, digital media players (PMPs), camera phones, smart phones, personal digital assistants (PDAs), tablet computing devices, laptop computers, desktop computers, smart TVs, game consoles, and the like. The recording unit 16 may include image sensors (e.g., photo sensors), lenses, or other optical components, microphones, and the like. The recording unit 16 can also be configured to cause storage of data representing audio, video, images, text, or other analog or digital signals on various data storage devices, e.g., the storage unit 13, and/or to generate media files for playback or streaming based on the recorded data.

In some embodiments, the operation data sensing unit 17 may include sensors configured to capture the operation data described below with reference to FIG. 5. For example, the operation data sensing unit 17 may include inertial sensors, position sensors (e.g., GPS and magnetometer), range sensors (e.g., ultrasound, infrared, and LIDAR), and the like, to collect operation data related to the state of the device 101. As discussed below, the operation data is not limited to the data collected by the sensing unit 17. The operation data may also include data generated or received by processing unit 12, which is related to the operational state or status of the device 101. For example, the processing unit 12 may receive control commands from terminal device 103, instructing the device 101 to hover around an object. The control command data may be an example of the operation data. The sensor unit 11 and its components may be operatively coupled to and/or carried as a payload by a wide variety of movable objects, such as the UAV.

The processing unit 12 may control the operation of the device 101. For example, the processing unit 12 may control the recording unit 16 to capture the video data, control the operation data sensing unit 17 to capture the operation data of device 101, and/or control the driving unit 14 to maneuver the device 101.

In some embodiments, the processing unit 12 may perform analog-to-digital conversion of audio, video, or other signals, compression or decompression of the signals using one or more coding algorithms, encryption and/or decryption of recorded data, playback, transmission and/or streaming of recorded data, and the other functionalities.

The storage unit 13 may store data that is captured, processed, generated, or otherwise used by the device 101 and/or the terminal device 103. In various embodiments, the data storage devices may be based on semiconductor, magnetic, optical, or any suitable technologies and may include flash memory, USB drives, memory cards, solid-state drives (SSDs), hard disk drives (HDDs), floppy disks, optical disks, magnetic tapes, and the like. In some embodiments, the storage devices can include one or more internal storage media and one or more external storage media.

The internal storage media may include one or more data storage devices that are typically an integral part of and not normally detached from the device 101. For example, the internal storage may be located within a body or housing of the device 101 and not easily removable. Examples of such internal storage media include internal flash memory such as NAND type flash memory and other suitable types of memory components. In some cases, the internal storage media can be accessed directly, via internal bus, by the recording unit 16.

The external storage media can include removable storage devices that are detachably couplable to the device 101. For example, the removable storage devices may be operatively connected to the recording unit 16 via a wired or hardware-based connection, capable of being inserted into and ejected from the recording unit 16, or attachable to the outside of the body of the recording unit 16. Such removable storage devices may include memory cards of any suitable formats such as PC Card, CompactFlash, SmartMedia, Memory Stick, Memory Stick Duo, Memory Stick PRO Duo, Miniature Card, Multimedia Card (MMC), Reduced Size Multimedia Card (RSMMC), MMCmicro Card (MMCmicro), PS2 card, Secure Digital (SD) card, SxS, Universal Flash Storage (UFS), miniSD, microSD, xD-Picture Card, Intelligent Stick (iStick), Serial Flash Module (SFM), NT Card, XQD card, and the like. The external storage media can also include external hard disk drives, optical drives, tape drives, floppy drives, and other suitable storage devices that may be operatively connected to the recording unit 16. In some cases, the external storage media can also include networked storage media such as data storage servers (e.g., cloud storage) that can communicate with the recording unit 16 via a wired or wireless network connection without requiring physical connection to the recording unit 16. The removable memory device 104 may be one example of the external storage media.

In some embodiments, storage unit 13 may be a non-transitory computer-readable storage medium storing instructions that, when executed by processing unit 12, cause one or more components of the device 101 to perform method 400 described below with reference to FIG. 5.

The driving unit 14 may control movements of the device 101. For example, the driving unit 14 may include rotors of a UAV.

The power unit 15 may supply power to one or more components of the device 101. The power unit 15 may include regular batteries (e.g., lithium-ion batteries), wirelessly chargeable batteries, and solar panel powered batteries (e.g., batteries attached to light-weight solar panels disposed on a UAV).

Figure 3:
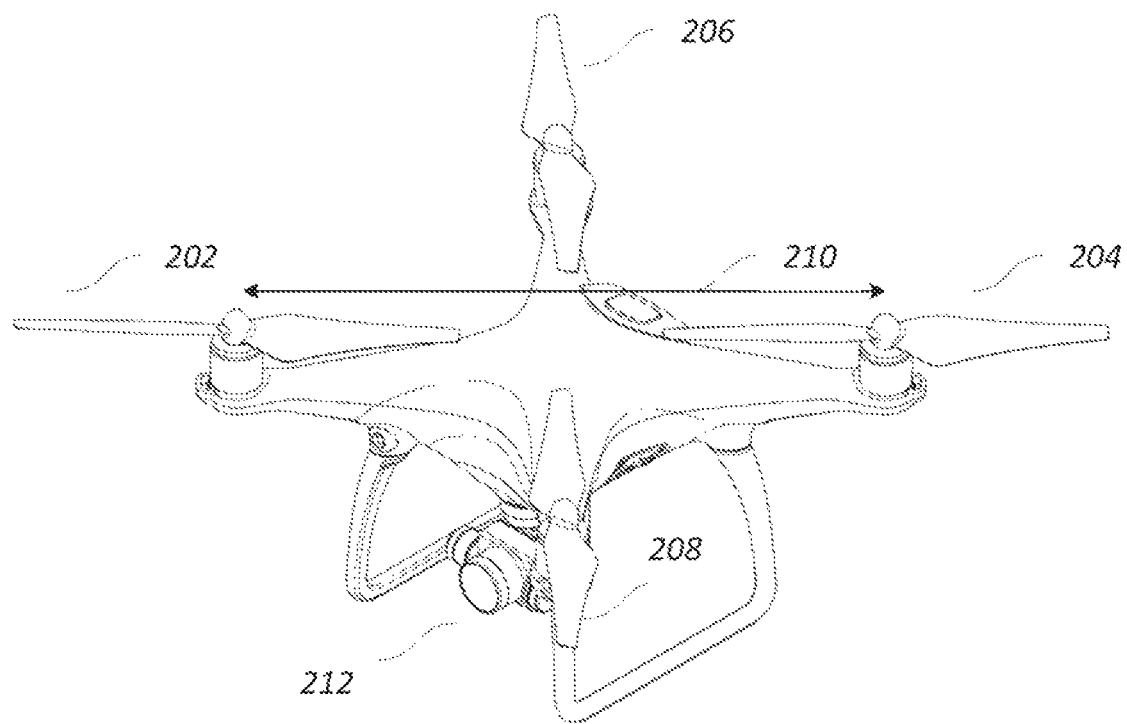
FIG. 3 is a graphical representation illustrating a UAV for combining UAV operation data and video data, consistent with exemplary embodiments of the present disclosure.

FIG. 3 is a graphical representation illustrating a UAV 200 for combining UAV operation data and video data, consistent with exemplary embodiments of the present disclosure. The UAV 200 may carry one or more components of the system 100 described above. The UAV 200 may be an example of the device 101 (e.g., a movable object) as described herein. The UAV 200 can include a propulsion system having four rotors 202, 204, 206, and 208. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 210. Any description herein of a UAV may apply to a movable object, such as a movable object of a different type, and vice versa.

In some embodiments, the movable object can be configured to carry a load 212. The load 212 can include one or more of passengers, cargo, equipment, instruments, and the like. The load 212 can be provided within a housing. The housing may be separate from a housing of the movable object, or be part of a housing for a movable object. Alternatively, the load 212 can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load 212 may include a payload. In some embodiments, the payload may be configured to implement methods for combining UAV operation data and video data as disclosed herein. For example, a movable object can be an UAV and the payload can include a recording unit 16 described above with reference to FIG. 2. The recording unit may be configured to capture videos, sound, and other data of the surroundings of the UAV. The captured data such as video may be streamed back down to a control terminal or base station. The methods for combining UAV operation data and video data, as disclosed herein, may be especially important for UAVs or other moving vehicles. UAVs are typically exposed to elements of nature and/or attacks of hostile forces, causing malfunction and/or to damage to the UAV and payload carried by the UAV, for example, due weather conditions, impact from landing/takeoff or surrounding obstacles, and the like. For example, a turbulence, impact or even crash of the UAV may cause a disconnect or damage to a component critical to recording operation of the recording unit, thereby disrupting the recording. As such, a recording unit carried by such a UAV should be prepared to recover gracefully from potentially frequent disruption of recordings caused by such abnormal events so as to protect the recorded media content data.

The payload can be configured not to perform any operation or function. Alternatively, the payload can be a payload configured to perform an operation or function, also known as a functional payload. For example, the payload may be an image capturing device. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload.

Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. For example, the communication may be with a terminal device described herein. Optionally, the payload can be configured to interact with the environment or a target. For example, the payload can include a tool, instrument, or mechanism capable of manipulating objects, such as a robotic arm.

Optionally, the load 212 may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform or a gimbal stabilizer) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

Figure 4:
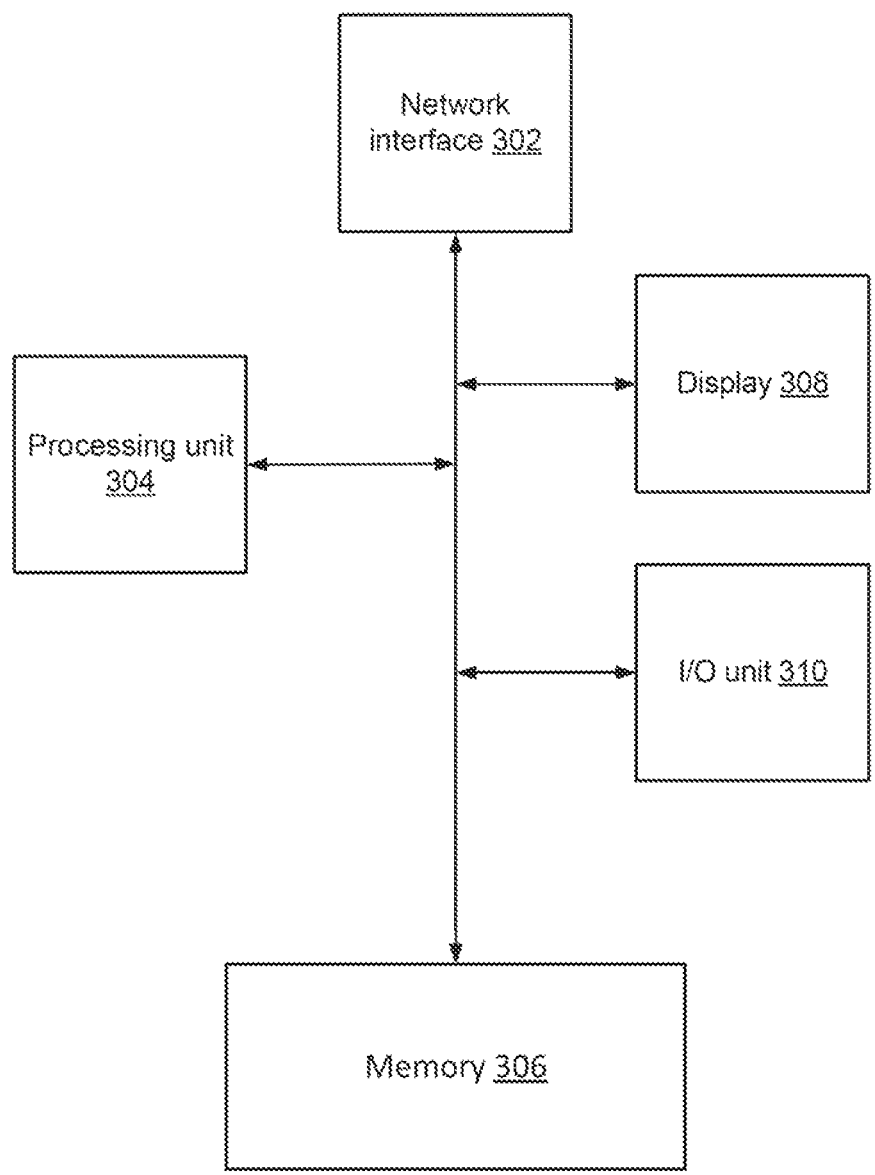
FIG. 4 is a block diagram illustrating a system for editing UAV operation data and video data, consistent with exemplary embodiments of the present disclosure.

FIG. 4 is a block diagram illustrating a system 300 for editing UAV operation data and video data (e.g., a video editing device), consistent with exemplary embodiments of the present disclosure. For example, the system 300 may be configured to be embodied on a terminal device such as the terminal device 103 discussed in FIG. 2, or components thereof. In some embodiments, the system 300 may include many more components than those shown in FIG. 4. However, it is not necessary that all of these components be shown in order to disclose an illustrative embodiment. The system 300 may include a network interface 302, a processing unit 304, a memory 306, a display 308, and an I/O unit 310, some of which may be optional. The components of the system 300 may be operatively connected to each other via a bus or other types of communication channels. The system 300 may also connect to other computers, mobile phones, and servers through a network for sharing edited video and/or remotely editing the video. The system 300 may also connect to a UAV through a cloud connection. The system 300 may also transfer or exchange data, files, or instructions with a UAV via a removable memory device, such as a secure digital (SD) card or a thumb drive.

The processing unit 304 may include one or more processors, such as a programmable processor (e.g., a central processing unit (CPU)). The processing unit 304 can be operatively coupled to a memory 306. The memory 306 can include transitory and/or non-transitory storage media configured to store data, and/or logic, code, and/or program instructions executable by the processing unit 304 for performing one or more routines or functions, and/or steps and methods disclosed herein. The memory can include one or more memory units (e.g., flash memory card, random access memory (RAM), read-only memory (ROM), and the like).

In some embodiments, inputs from the I/O unit 310 can be conveyed to and stored within the memory units of the memory 306.

The memory units of the memory 306 can store routines, logic, and/or code comprising program instructions executable by the processing unit 304 to perform any suitable embodiment of the methods described herein. For example, memory 306 may be a non-transitory computer-readable storage medium storing instructions that, when executed by processing unit 304, cause system 300 to perform method 500 described below with reference to FIG. 6. Although FIG. 4 depicts a single processing unit 304 and a single memory 306, one of skill in the art would appreciate that this is not intended to be limiting, and that the system 300 can include a plurality of processing units and/or memory units of the memory. In some embodiments, memory 306 may store a plurality of video editing models. Each of the video editing models may be associated with one or more types of the operation data as described below with reference to method 500.

As shown in FIG. 4, the system 300 can include a network interface 302 configured to allow communication with external devices. The communication may be wireless or wire/cable-based. For example, the network interface 302 may include transmitters, receivers, and/or transceivers for transmitting data to and/or receiving data from the external devices. The network interface 302 can also include one or more network cards for communications over one or more networks such as the Internet, wireless networks, cellular networks, and any other network. In some embodiments, the system 300 may not include any network interface 302.

The display 308 may be configured to provide a graphical user interface to a user operating the system 300 for receiving user input (e.g., a video editing interface), and/or displaying output (e.g., audio and video of execution results of steps in the method 500). In some embodiments, the system 300 may not include any display 308.

The I/O unit 310 may be configured to provide a user interface to operate the system 300 (e.g., receiving a user inputted keyword for editing a video). Details of the user interaction with the system 300 are described below with reference to method 500.

Figure 5:
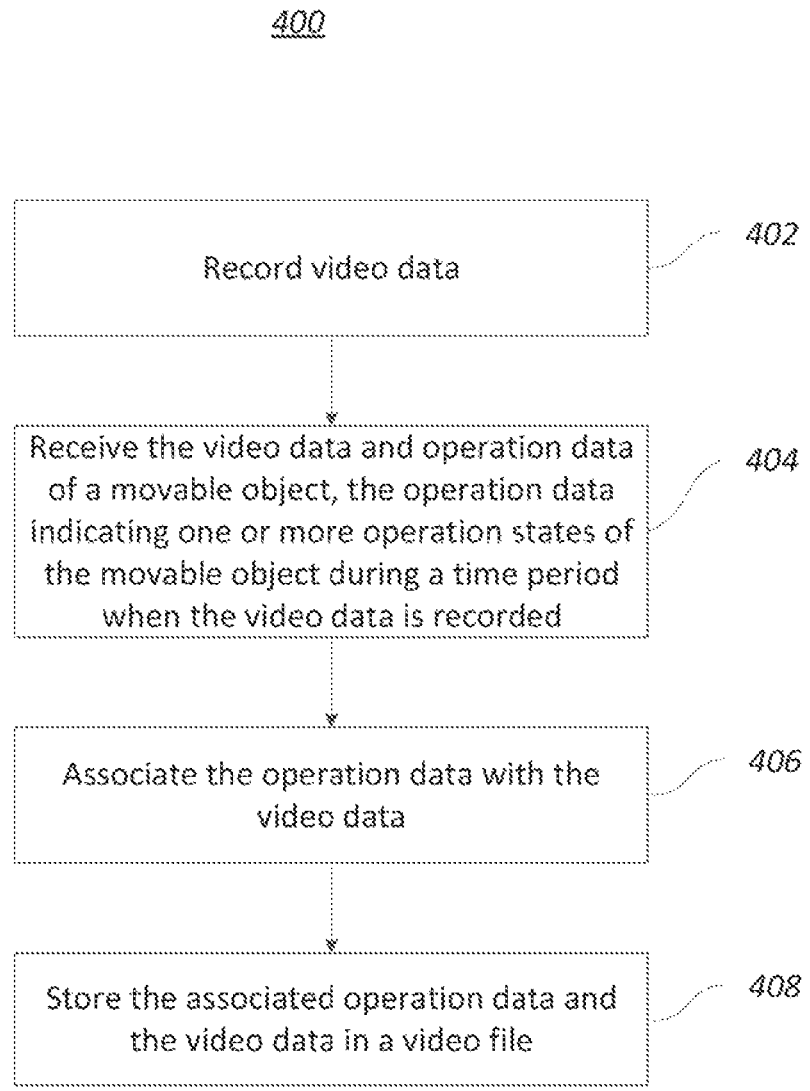
FIG. 5 is a flowchart illustrating a method for combining UAV operation data and video data, consistent with exemplary embodiments of the present disclosure.

FIG. 5 is a flowchart illustrating a method 400 for combining UAV operation data and video data, consistent with exemplary embodiments of the present disclosure. The method 400 may comprise a number of steps, some of which may be optional or may be rearranged in another order.

At step 402, one or more components of the system 100 may record video data. For example, the recording unit 16 of the device 101 described above with reference to FIG. 2 or the payload of the load 212 described above with reference to FIG. 3 may comprise a system including at least one sensor, and the at least one sensor may record the video data. The video data may include visual images recorded frame by frame.

At step 404, one or more components of the system 100 may receive the video data and operation data of a movable object that carries the at least one sensor, the operation data indicating one or more operation states of the movable object during a time period when the video data is recorded. For example, individually or collectively, one or more processors of the processing unit 12 described above with reference to FIG. 2 may receive the video data and the operation data. The operation data may include position, attitude, or movement information of the recording unit 16 or the UAV 200, and will be described in more details below.

At step 406, one or more components of the system 100 may associate the operation data with the video data. For example, individually or collectively, one or more processors of the processing unit 12 described above with reference to FIG. 2 may associate the operation data with the video data. In some embodiments, the processing unit 12 may determine time stamps of the video data, so that each frame of the video data may include a time when the frame was captured. The video time stamps may be stored with the video frames.

The association described in step 406 may be performed by a synchronous or an asynchronous method. With regard to the synchronous method, the processing unit 12 may associate the operation data with each frame of the video data. For example, frame 1 to frame 100 may each associate with information such as a current flight altitude, a current flight speed, and a current flight direction of a UAV. With regard to the asynchronous method, the processing unit 12 may add time stamps to the operation data for synchronization with the video data. For example, the processing unit 12 may receive the operation data and add time stamps to the received operation data. Since video frames contain corresponding time stamps, the video data and the operation data can be associated or linked by the time stamps. At a later step, the processing unit 12 may further associate or identify any video frame with corresponding operation data by matching the video data time stamps and the operation data time stamps.

At step 408, one or more components of the system 100 may store the associated operation data and the video data in a video file. For example, individually or collectively, one or more processors of the processing unit 12 described above with reference to FIG. 2 may store the associated operation data and the video data in a single video file in the storage unit 13, in the memory 306 of the system 300, and/or in other devices through the network 102. The single video file may be stored in a video format such as MP4, MOV, or AVI. Storing operation data and video data in a single video file may facilitate data storage, data transmission, and video editing described below with reference to FIG. 6. For example, when transferring video files, users may only copy the main video file without copying other associating files, and this problem can be prevented by storing the operation data and the video data together to generate a single video file.

Figure 7:
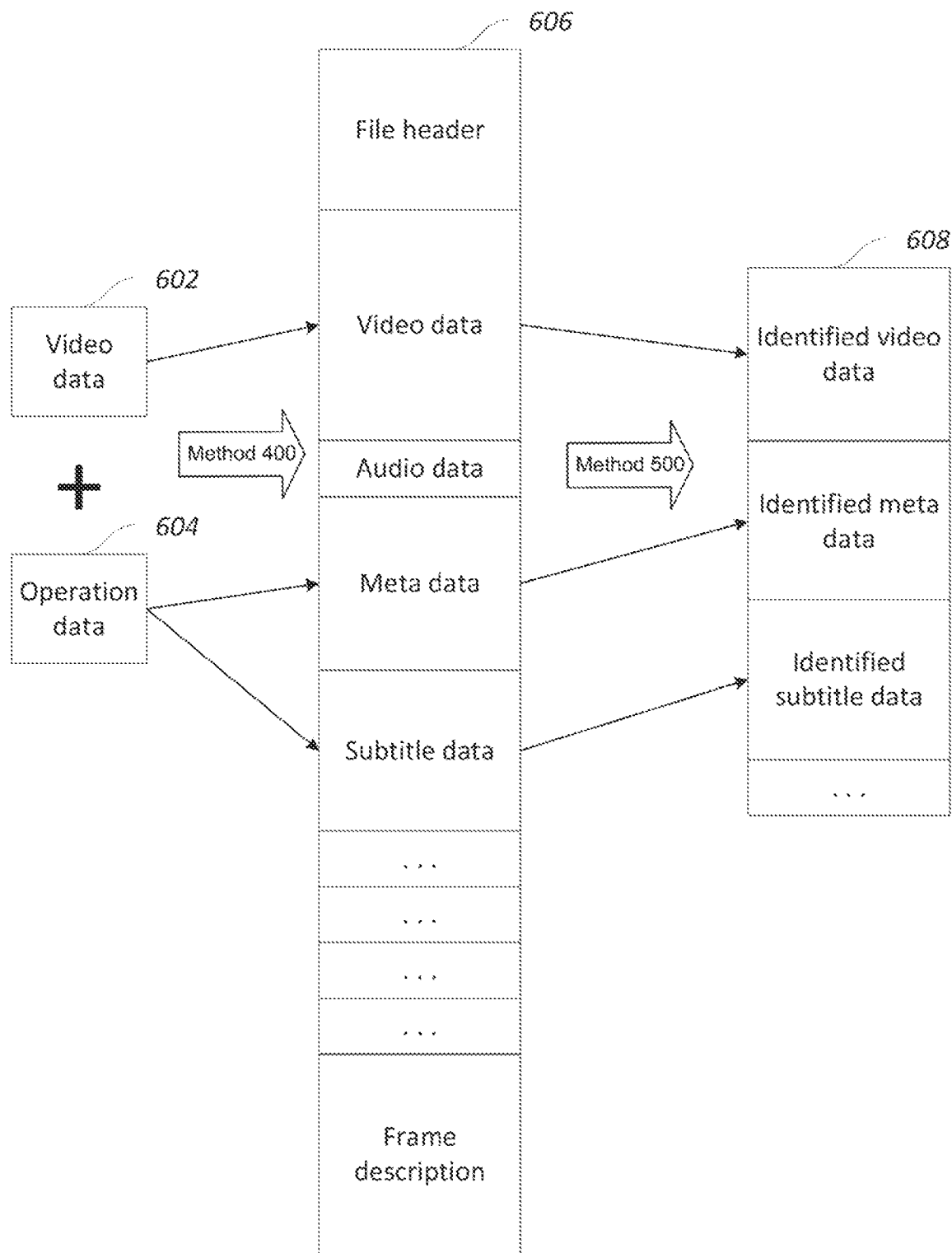
FIG. 7 is a graphical representation illustrating method 400 and method 500, consistent with exemplary embodiments of the present disclosure.

An exemplary result of method 400 is described below with reference to FIG. 7. As illustrated in FIG. 7, through the method 400, the video data 602 and the operation data 604 may be stored in the video file 606, while the video data in being associated with the operation data. Arrows pointing from one block to another may indicate data sections that have been transformed by the method. The video file 606 may comprise contents such as file header, video data, audio data, meta data, subtitle data, and frame description, some of which may be optional. Each content may comprise one or more tracks or frames. For example, the video data of the video file 606 may comprise time-dependent video tracks or video frames. The file header and/or the frame description may comprise information describing the content data such as size, length, height/width of a video file, frame rate, encoding parameters, and time stamp. The order of the contents in the video file 606 may be rearranged.

In some embodiments, one or more components of the system 100 may associate the operation data with the frames of the video data. For example, one or more processors of the processing unit 12 may, individually or collectively, associate frames 100-300 of the video data with a flight altitude above 10 meters and a straight-line flight pattern, and associate frames 400-500 of the video data with a flight altitude of 15 meters and a circular flight pattern.

In some embodiments, one or more components of the system 100 may associate the operation data with a set of time stamps. For example, one or more processors of the processing unit 12 may, individually or collectively, associate flight altitudes, a subset of the operation data recorded in real time, correspondingly with a set of time stamps.

In some embodiments, one or more components of the system 100 may receive the operation data in real time when the sensor is recording the video data. For example, one or more processors of the processing unit 12 may, individually or collectively, receive and record the operation data in real time from operation data sensing unit 17 when the recording unit 16 is recording the video data.

In some embodiments, one or more components of the system 100 may associate the operation data with the video data in real time when the sensor is recording the video data. For example, one or more processors of the processing unit 12 may, individually or collectively, associate frame 10 of the video data with a flight altitude of 10 meters, at the same time when the frame 10 is being captured and the flight altitude is being measured.

In some embodiments, one or more components of the system 100 may store the associated operation data and the video data in the video file in real time when the sensor is recording the video data. For example, one or more processors of the processing unit 12 may, individually or collectively, store the associated operation data and the video data in the video file in real time when the recording unit 16 is recording the video data. The processing unit 12 may store the video file in the storage unit 13.

In some embodiments, one or more components of the system 100 may receive a setting on the operation data, and store the operation data and the video data in the video file according to the setting. The processing unit 12 may generate an interface configured to receive the setting from a user. The one or more processors of the processing unit 12 may, individually or collectively, receive the user setting, and store the operation and the video data in the video file according to the user setting. For example, the user setting may include selecting a tracking mode (e.g., tracking people, animals, or objects). In one example of selecting a tracking mode for tracking people, which may be a UAV flying and operation mode for real-time automatic people detection, tracking, and filming of the detected and tracked one or more people, the processing unit 12 may identify the operation data associated with the tracking mode, identify video data associated with the identified operation data, and store the identified operation data and video data in the video file. In some embodiments, the tracking mode may be a flight mode of the device 101 and/or the UAV 200. Under this mode, the device or the UAV 200 may detect one or more people by one or more onboard sensors and stored people recognition algorithms, and move in a predetermined pattern to keep capturing video data of the detected people. The predetermined pattern may include operation parameters of the device 101, such as a predetermined flight pattern of the device 101 and a predetermined angle of the recording unit 16. The parameters may also include a range or a selection of parameters adjustable according to a current state/status of the device 101 and/or a current state/status of the tracked people. Operation data of the device 101 or the UAV 200 captured under this mode may be associated with the captured video data, and stored in the video file according to the tracking mode setting. For example, the operation data may indicate that the UAV 200 is flying under a tracking mode. The captured video data is associated with such operation data. When a user inputs search inquiry "tracking mode," e.g., in the terminal device 103, the terminal device 103 will be able to identify the associated video data.

In some embodiments, the setting may comprise defining a subset of the operation data to be associated with the video data and to be stored in the video file. One or more components of the system 100 may store the subset of the operation data associated with the video data in the video file.

In some embodiments, the setting may comprise types of the operation data to be recorded. For example, one or more components of the system 100 may record flight patterns and flight positions of the operation data according to a user-defined setting.

In some embodiments, the setting may comprise storing the operation data as meta data or as subtitle data, storing the subtitle data as active or inactive subtitle data, storing the associated operation data as meta data of the video file, and/or storing the operation data in an encrypted form or a non-encrypted form. Meta data may include data that provides information about other data. Some meta data, such as protocol status, may not be configurable. Subtitle data may include subtitles displayable on the video data. The active subtitle data may be displayed on video frames of the video data. The inactive subtitle data may be hidden on video frames of the video data. The video file 606 described in FIG. 7 may illustrate various data components stored therein by method 400.

In some embodiments, the operation data may comprise one or more of the following types of information associated with the movable object (e.g., the UAV 200 or the load 212): flight control information, position information, home point information, gimbal status information, tracking status information, obstacle information, altitude information, velocity information, flight mode information, moving direction information, battery information, and gimbal information. Any of the above information or a portion of the information can be stored as meta data or subtitle data. The flight control information may include instructions stored in storage unit 13 or instructions from terminal device 103 to control device 101. The position information may include GPS positions of the UAV and/or relative positions of the UAV to another object. The home point information may include a position for the UAV to return to after taking off. The gimbal status information may include 3-axes gimbal angles. For a camera mounted on the gimbal, the gimbal status information may indicate which direction the camera is facing relative to the gimbal. Based on the relative direction of the camera to the gimbal, camera positon on the gimbal, gimbal position on the UAV, and UAV position in the 3D space, one or more components of the device 101 may determine in real time the direction that the camera faces in the 3D space. The tracking status information may include if the UAV is tracking any object and/or there is any tracked object(s). The obstacle information may include if an obstacle is detected, the position of the obstacle, flight control choices to avoid the obstacle, and/or if the obstacle is avoided. The altitude information may include flying altitudes of the UAV. The velocity information may include flying velocities of the UAV. The flight mode information may include flying status of the device 101 or the UAV 200. The flight mode information may include predetermined flight modes stored in storage unit 13 or the terminal device 103, or may be determined in the field. For example, the flight modes may include a tracking mode described above, a watching mode (e.g., watching one or more objects by adjusting gimbal configuration of a camera of an operating UAV in real time, such that the one or more objects remain in a field of view of the camera), a point of interest (POI) mode (e.g., controlling the UAV to hover about a user-defined point of interest and/or filming a 360 degree video of the point of interest), and etc. The moving direction information may include flying directions of the UAV. The battery information may include remaining battery amount or remaining operation time of the power unit 15. The gimbal information may include parameters and configurations of a gimbal onboard the UAV.

In some embodiments, the operation data may comprise one or more of the following types of information associated with the at least one sensor (e.g., a camera of sensor unit 11, and the camera may be mounted in a gimbal): Automatic focus (AF) information, Automatic exposure (AE) information, and Automatic white-balance (AWB) information, sharpness information, contrast information, saturation information, shutter speed information, zoom information, digital effect information, lens information, metering mode information, focus region information, and iris information. Any of the above information or a portion of the information can be stored as meta data or subtitle data.

In some embodiments, the operation data may also include reverse operation data depending on a presentation interface of the data. For example, the above information, such as the gimbal information and the information associated with the at least one sensor, may be captured in a gimbal reference coordinate system, but may be converted to a different coordinate system when presented at the terminal device 103, e.g., a mobile phone, for easy viewing and editing.

In some embodiments, one or more components of the system 100 may encrypt at least a portion of the associated operation data and store the encrypted portion of the associated operation data as the meta data of the video file. For example, one or more processors of processing unit 12 may, individually or collectively, encrypt a portion or all of the associated operation data and store the encrypted operation data as the meta data of the video file.

In some embodiments, one or more components of the system 100 may store the associated operation data as the subtitle data of the video file. For example, one or more processors of processing unit 12 may, individually or collectively, store the associated operation data as the subtitle data of the video file.

In some embodiments, one or more components of the system 100 may store at least a portion of the subtitle data in an inactive form. For example, one or more processors of processing unit 12 may, individually or collectively, store a portion or all of the subtitle data in an inactive form. For example, processing unit 12 of a UAV may store the position information as inactive subtitle data and store the altitude information as active subtitle data, because a user of the UAV may not like others to know where the video was taken, but would like to display the UAV altitudes on video frames for convenient video editing. The user-defined settings of the subtitle data can facilitate video editing described below and provide functions not present in existing technologies described in the background section.

In some embodiments, one or more components of the system 100 may store the associated operation data in a searchable form in the video file, analyze at least a subset of the associated operation data, and/or identify at least a portion of the video data corresponding to the analyzed subset of the associated operation data. Storing the associated operation data in the searchable form generally means making the stored operation data searchable, for example, storing the operation data in a searchable database, making the text of the operation data searchable, classifying the associated operation data by search tags, such that when a user searches for certain operation data by a keyword, the certain operation data can be identified by matching the search tags with the keyword. A person having ordinary skill in the art should appreciate that other conventional techniques can be used to make the operation data searchable. For example, one or more processors of processing unit 12 may, individually or collectively, store the associated operation data in a searchable form in the video file, analyze at least a subset of the associated operation data, and/or identify at least a portion of the video data corresponding to the analyzed subset of the associated operation data. The operation data, associated with the video data and stored as meta data or as subtitle data, can be searched with user's inquiries entered through a user interface, e.g., by a keyword, to locate the searched video frame(s). For example, if a user inputs a search for a location or place, the processing unit 12 may search or analyze the associated operation data to obtain operation data corresponding to the POI flight mode, where the UAV circles around a POI to allow an onboard camera to capture a 360 degree surrounding view of the POI. Consequently, the processing unit 12 may also identify frames of the video data associated with the obtained POI operation data.

FIG. 6 is a flowchart illustrating a method 500 for editing UAV operation data and video data, consistent with exemplary embodiments of the present disclosure. The method 500 may comprise a number of steps, some of which may be optional or may be rearranged in another order.

At step 502, one or more components of the system 300 may receive a user input to search a video file obtained by a movable object. For example, the I/O unit 310 may receive the user input to search the video file obtained by the movable object, the video file comprising video data recorded by at least one sensor and operation data of the movable object that carries the at least one sensor, and the operation data indicating one or more operation states of the movable object during a time period when the video data is recorded and being associated with the video data. The I/O input 310 may transmit the received input to the processing unit 304. The movable object, the operation data, and the association process may be those or similar to those described above with reference to FIGS. 1-4.

At step 504, one or more components of the system 300 may identify, from the video file, operation data that corresponds to the user input. For example, the processing unit 304 may search the operation data to identify operation data that corresponds to the user input.

At step 506, one or more components of the system 300 may identify video data that corresponds to the identified operation data. For example, the processing unit 304 may identify video data that corresponds to the identified operation data.

In some embodiments, for example, if the user input is to identify POI operation data, the processing unit 304 may search the operation data and identify operation data captured when the UAV is flying under a POI mode, and identify video data that corresponds to the POI operation data. The steps 505 and 506 may be similar to the embodiment described above with reference to FIG. 5.

An exemplary result of method 500 is described below with reference to FIG. 7. As illustrated in FIG. 7, through the method 500, a file 608 can be obtained from the video file 606. The file 608 may comprise contents such as identified video data, identified meta data, and identified subtitle data, some of which may be optional. The order of the contents in the file 608 may be rearranged. Each content may comprise one or more tracks or frames. For example, the identified video may comprise time-dependent video tracks or video frames. In some embodiments, each frame or track of the identified video data may be associated with the identified meta data and/or the identified subtitle, and the association may be based on time stamps.

In some embodiments, the video file obtained by the movable object may be the video file described above with reference to FIG. 5. As described, in some embodiments, each frame of the video data may be associated with the operation data. In some embodiments, the operation data may be associated with a set of time stamps.

In some embodiments, the processing unit 304 may associate the operation data with the video data by a match of the time stamps of the operation data with time stamps of frames of the video data. For example, the processing unit 304 may associate a video frame captured at time T1 with flight altitude data captured at the time T1.

In some embodiments, the operation data may be received or generated by the movable object in real time, when the sensor records the video data.

In some embodiments, the operation data may be associated with the video data in real time, when the sensor records the video data. In some embodiments, the associated operation data and the video data may be stored in the video file in real time, when the sensor records the video data. In some embodiments, at least a subset of the operation data is associated with the video data and stored in the video file according to the setting. The association may be performed as described above.

In some embodiments, the operation data and the video data may be stored in the video file according to a setting received by the movable object. The setting may comprise storing the operation data as meta data or as subtitle data. The setting may comprise storing the subtitle data as active or inactive subtitle data. The setting may comprise storing the operation data as encrypted or non-encrypted data. The setting, the meta data, and the subtitle data may be similar to those described above with reference to method 400.

In some embodiments, the associated operation data may be stored as meta data of the video file. In some embodiments, at least a portion of the associated operation data may be encrypted and stored as meta data of the video file. In some embodiments, the associated operation data may be stored as subtitle data of the video file. In some embodiments, at least a portion of the subtitle data may be stored in an inactive form, e.g., not displayed on a video frame. In some embodiments, the associated operation data may be stored in a searchable form in the video file.

In some embodiments, one or more components of the system 300 may identify at least one of the video editing models according to the user input. The video editing models may be stored in memory 306 described above. For example, a user may enter a point of interest at the I/O unit 310. The processing unit 304 may determine if any of the stored video editing models matches with the user input. In some embodiments, the processing unit 304 may identify one or more of the video editing models matching with the user input. For example, by a search of the entered point of interest from operation data, the processing unit 304 may identify a "personal hotspot" mode, which has the same point of interest and was deployed during the flight. Accordingly, the process unit 304 may identify a POI video editing model corresponding to the POI mode. Alternatively, the user can directly input commands or make selections such as generating video models based on flight modes, the processing unit 304 may search for all flight modes deployed in the flight and identify one or more corresponding video editing models.

In some embodiments, one or more components of the system 300 may generate a video editing interface that presents the identified video data based on the identified at least one of the video editing models. The video editing interface may also access the operation data corresponding to the identified video editing model. For example, one or more processors of the processing unit 304 may generate a video editing interface that presents the identified video data (e.g., the identified video data from step 506) based on the identified at least one of the video editing models. For another example, if a user input is a POI, the processing unit 304 may identify a video editing model corresponding to the POI, search from operation data to identify operation data corresponding to the POI, identify video data corresponding to POI operation data, and generate a video editing interface to present the identified video data. Based on the identified video editing model, the generated video editing interface may provide corresponding editing functions. For example, a video editing interface corresponding to the POI may offer unique editing functions such as POI viewing angle adjustment options.

In some embodiments, the video editing models may include a model for identifying the video data based on the operation data. One or more components of the system 300 may identify the video data based on the identified at least one of the video editing models. For example, one or more processors of the processing unit 304 may receive a user input POI and identify a video editing model corresponding to POI. The video editing model may include identification rules to identify POI operation data and association rules between the operation data and the video data. For example, a POI video editing model may require video frames and operation data captured while the UAV is flying in a POI mode. Accordingly, the processing unit 304 may identify operation data corresponding to the mode and video data corresponding to the identified operation data, based on the identification and association rules. For another example, the processing unit 304 may identify operation data indicating a smooth flight, for example, by filtering out operation data with large altitude fluctuations, identify video frames associated with the filtered operation data, and present the identified video frames.

In some embodiments, the video editing models may include a model for remixing the identified video data. One or more components of the system 300 may remix the identified video data based on the identified at least one of the video editing models. In some embodiments, one or more components of the system 300 may remix the identified video data by associating the identified video data with a music. For example, one or more processors of the processing unit 304 may remix the identified video data based on the identified at least one of the video editing models, by associating the identified video data with a music. For example, if a user identifies a video editing model "add music," the processing unit 304 may remix the identified video data with a music by adding the music as a background music to the identified video data.

In some embodiments, one or more components of the system 300 may associate the video data with the music according to the operation data associated with the video data and one or more characteristics of the music, as described in the following examples. The following examples or functions may be integrated in an application of the system 300, such that users can execute the functions by inputting simple commands.

One or more components of the system 300 may define a play speed the video data based on a tempo of the music. For example, the processing unit 304 may associate frames of video data with a music. At sections of the music having a fast tempo (e.g., Presto), the processing unit 304 may increase the play speed of the associated video frames by associating more frames per unit time or decreasing the display time per frame. At sections of the music having a slow tempo (e.g., Lento), the processing unit 304 may decrease the play speed of the associated video frames by associating fewer frames per unit time or increasing the display time per frame. For another example, the processing unit 304 may associate video frames captured in a steady flight (e.g., altitude fluctuations below a predetermined threshold) and in a straight direction with sections of the music having a slow tempo. The altitude and direction information may be a part of the operation data associated with the video data.

One or more components of the system 300 may identify the video data according to a tempo of the music. For example, the processing unit 304 may associate frames of video data with a music based on moving speeds or flying altitudes of the recording device, the moving speeds and flying altitude being a part of the operation data. The processing unit 304 may associate video frames captured at a fast flying speed or a low altitude (e.g., over or below a predetermined threshold) of the UAV with sections of the music having a fast tempo, the UAV carrying the recording device. The processing unit 304 may associate video frames captured at a slow flying speed or at a high altitude with sections of the music having a slow tempo.

One or more components of the system 300 may identify the music based on a scene of the video data. For example, the processing unit 304 may determine if the video frames contain slow-changing scenes and fast-changing scenes, and may select a slow tempo music to add to the slow-changing scenes, and a fast tempo music to add to the fast-changing scenes. For another example, the processing unit 304 may determine, based on position information included in the operation data, a location where the video data was captured, e.g., at a beach, in a forest, or in a city metro area. The processing unit 304 may determine the music according to predetermined music characteristics of each location. For example, scenes captured in a forest may be matched with a slow and quiet music with a mystic mood.

One or more components of the system 300 may associate the identified video data to the music. For example, the processing unit 304 may associate the identified video data to the music by associating the music to identified video frames, and playing the music when displaying the associated frame. The processing unit 304 may also divide the identified video data into frame groups according to various scenes and associate the scenes to various sections of the music.

One or more components of the system 300 may delete a portion of the video data based on obstacle information of the movable object. For example, the processing unit 304 may determine that some video frames may be captured while the UAV is maneuvering to avoid an obstacle (e.g., flying in an obstacle avoiding mode), and accordingly delete the video frames, thereby reducing the video editing workload of the user. The obstacle information may be a part of the operation data.

In one example with reference to both methods 400 and 500, a user may use a UAV described above to capture a video. The captured video may include video data. The UAV may also capture operation data of the UAV while capturing the video data. The user may use a cellphone to control the UAV. During or after the video capture, the user may also run a cellphone application to edit the captured video (e.g., by a cellphone processor). The user may enter a command "auto-video-generation and add music ABC." The application may identify an "auto-video-generation" model and an "music addition" model corresponding to the command. Default settings of the "auto-video-generation" model may include selecting operation data having flight altitudes between 5 to 10 meters and altitude fluctuations below 0.02 meters per second. According to the default settings, the application may identify the operation data. The application may also identify video frames corresponding to the identified operation data by matching time stamps of the operation data and the video data (e.g., by the asynchronous manner described above), or by identifying the video frames associated with the identified operation data (e.g., by the synchronous manner described above). According to the "music addition" model, the application may associate the identified video frames with the music by editing the identified video frames. At slow parts of the music, the application may slow down the play speed of the video. At fast parts of the music, the application may associate video frames associated with a UAV flying speed over 15 meters per second. After the editing, the application may present the edited video data with the background music to the user at the cellphone.

As described above, users can conveniently generate a video clip from captured raw footages, for example, UAV-captured video data, with desired contents and with an appropriate background music. The disclosed methods and system can significantly reduce the workload and the requirement of professional knowledge of video editing, allowing people of ordinary skill in the art to easily obtain automatically edited video clips from raw footages. For example, with the disclosed methods and devices, a user may obtain a presentable video with just a few clicks, without even having to review or select raw footages. Such functions are enabled by the system 100, the device 200, the system 300, the method 400, and/or the method 500 described above. For example, associating the operation data with the video data can label each video frame with various statistics and provide an access for editing the each video frame, whether by the user or by an automatic process. Such functions are further enhanced by the system carried by the movable object described herein, providing the statistics for labeling the video frames matching with user inputs.

Another aspect of the disclosure is directed to a non-transitory computer-readable storage medium storing instructions which, when executed, cause one or more processors to perform the methods, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage unit or the memory module having the computer instructions stored thereon, as disclosed. In some embodiments, the computer-readable storage medium may be a disc or a flash drive having the computer instructions stored thereon.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present disclosure. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for combining and editing UAV operation data and video data. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present disclosure is not limited to the exact construction that has been described above and illustrated in the accompanying drawings, and that various modifications and changes can be made without departing from the scope thereof. It is intended that the scope of the invention should only be limited by the appended claims.

What is claimed is:

1. A system for combining data, comprising:
one or more processors, individually or collectively, configured to:
receive video data recorded by at least one sensor and operation data of a movable object that carries the at least one sensor, the operation data indicating one or more operation states of the movable object during a time period when the video data is recorded, and the operation data including operation parameters of a gimbal onboard the movable object during the time period when the video data is recorded and at least one of a moving speed or a flying altitude of the movable object during the time period when the video data is recorded;
associate the operation data with the video data;
associate, according to both the operation data that is associated with the video data and one or more characteristics of a music, the video data with the music, the one or more characteristics including a tempo of the music;
store the associated operation data and the video data in a video file;
analyze at least a subset of the associated operation data; and
identify at least a portion of the video data corresponding to the analyzed subset of the associated operation data.

2. The system of claim 1, wherein the one or more processors are individually or collectively configured to associate the operation data with each frame of the video data.

3. The system of claim 1, wherein the one or more processors are individually or collectively configured to associate the operation data with a set of time stamps.

4. The system of claim 1, wherein the one or more processors are individually or collectively configured to receive the operation data in real time when the at least one sensor is recording the video data.

5. The system of claim 4, wherein the one or more processors are individually or collectively configured to associate the operation data with the video data in real time when the at least one sensor is recording the video data.

6. The system of claim 1, wherein the one or more processors are individually or collectively configured to receive a setting on the operation data, and store the operation data and the video data in the video file according to the setting.

7. The system of claim 6, wherein the one or more processors are individually or collectively configured to generate an interface configured to receive the setting.

8. The system of claim 6, wherein the setting comprises defining a subset of the operation data to be associated with the video data and to be stored in the video file.

9. The system of claim 6, wherein the setting comprises information on types of operation data to be recorded.

10. The system of claim 1, wherein the movable object comprises an unmanned aerial vehicle (UAV) or a hand-held device.

11. The system of claim 1, wherein the operation data further comprises at least one of flight control information of the movable object, position information of the movable object, home point information of the movable object, tracking status information of the movable object, obstacle information of the movable object, altitude information of the movable object, velocity information of the movable object, flight mode information of the movable object, moving direction information of the movable object, battery information of the movable object, or gimbal information of the movable object.

12. The system of claim 1, wherein the operation data further comprises at least one of Automatic focus (AF) information of the at least one sensor, Automatic exposure (AE) information of the at least one sensor, Automatic white-balance (AWB) information of the at least one sensor, sharpness information of the at least one sensor, contrast information of the at least one sensor, saturation information of the at least one sensor, shutter speed information of the at least one sensor, zoom information of the at least one sensor, digital effect information of the at least one sensor, lens information of the at least one sensor, metering mode information of the at least one sensor, focus region information of the at least one sensor, or iris information of the at least one sensor.

13. The system of claim 1, wherein the one or more processors are individually or collectively configured to store the associated operation data as meta data of the video file.

14. The system of claim 1, wherein the one or more processors are individually or collectively configured to encrypt at least a portion of the associated operation data and store the encrypted portion of the associated operation data as meta data of the video file.

15. The system of claim 1, wherein the one or more processors are individually or collectively configured to store the associated operation data as subtitle data of the video file.

16. The system of claim 1, wherein the one or more processors are individually or collectively configured to store the associated operation data in a searchable form in the video file.

17. A method for combining data, comprising:
receiving video data recorded by at least one sensor and operation data of a movable object that carries the at least one sensor, the operation data indicating one or more operation states of the movable object during a time period when the video data is recorded, and the operation data including operation parameters of a gimbal onboard the movable object during the time period when the video data is recorded and at least one of a moving speed or a flying altitude of the movable object during the time period when the video data is recorded;

associating the operation data with the video data;

associating, according to both the operation data that is associated with the video data and one or more characteristics of a music, the video data with the music, the one or more characteristics including a tempo of the music;

storing the associated operation data and the video data in a video file;

analyzing at least a subset of the associated operation data; and identifying at least a portion of the video data corresponding to the analyzed subset of the associated operation data.

18. A system for combining data, comprising:

at least one sensor configured to record video data; and one or more processors, individually or collectively, configured to:

receive the video data and operation data of a movable object that carries the at least one sensor, the operation data indicating one or more operation states of the movable object during a time period when the video data is recorded, and the operation data including operation parameters of a gimbal onboard the movable object during the time period when the video data is recorded and at least one of a moving speed or a flying altitude of the movable object during the time period when the video data is recorded;

associate the operation data with the video data;

associate, according to both the operation data that is associated with the video data and one or more characteristics of a music, the video data with the music, the one or more characteristics including a tempo of the music;

store the associated operation data and the video data in a video file;

analyze at least a subset of the associated operation data; and identify at least a portion of the video data corresponding to the analyzed subset of the associated operation data.

19. The system of claim 1, wherein the one or more processors are individually or collectively configured to:

receive a selection of an operation mode of the movable object from a plurality of modes including a tracking mode, a watching mode, and a point of interest (POI) mode, the movable object being operated in the selected operation mode during the time period when the video data is recorded; and store the associated operation data and the video data in the video file according to the selection.

* * * * *